United States Patent [19]
Hiura et al.

[11] Patent Number: 5,698,175
[45] Date of Patent: Dec. 16, 1997

[54] PROCESS FOR PURIFYING, UNCAPPING AND CHEMICALLY MODIFYING CARBON NANOTUBES

[75] Inventors: Hidefumi Hiura; Thomas Ebbesen, both of Tokyo, Japan

[73] Assignee: NEC Corporation, Tokyo, Japan

[21] Appl. No.: 497,895

[22] Filed: Jul. 3, 1995

[30] Foreign Application Priority Data

Jul. 5, 1994 [JP] Japan .................................. 6-153192

[51] Int. Cl.$^6$ .............................. C01B 31/00; D01F 9/12
[52] U.S. Cl. ...................... 423/447.1; 423/460; 423/461; 423/445 B
[58] Field of Search ............. 423/445 B, 447.1, 423/447.2, 447.3, 461, 460

[56] References Cited

U.S. PATENT DOCUMENTS

| | | | |
|---|---|---|---|
| 3,989,802 | 11/1976 | Joo et al. | 423/447.1 |
| 4,009,305 | 2/1977 | Fujimaki et al. | 423/447.1 |
| 4,816,289 | 3/1989 | Komatsu | 423/447.3 |
| 5,346,683 | 9/1994 | Green | 423/447.2 |

FOREIGN PATENT DOCUMENTS

| | | |
|---|---|---|
| 6-153192 | of 0000 | Japan . |
| 6-157016 | of 0000 | Japan . |

OTHER PUBLICATIONS

T.W. Ebbesen, et al, Purification of nanotubes, Nature International Weekly Journal of Science, Feb. 10, 1994.

P.M. Ajayan, et al, Opening carbon nanotubes with oxygen and implications for filling, Nature International Weekly Journal of Science, Apr. 8, 1993.

S.C. Tsang, et al, Thinning and opening of carbon nanotubes by oxidation using carbon dioxide, Letters to Nature, Apr. 8, 1993.

T.W. Ebbesen, et al, Large–scale synthesis of carbon nanotubes, Nature International Weekly Journal of Science, Jul. 16, 1992.

Tsang, S.C., et al. "A simple chemical Method of Opening and Filling Carbon Nanotubes", Nature, vol. 372, 10 Nov. 1994, pp. 159–162.

*Primary Examiner*—Steven Bos
*Assistant Examiner*—Peter DiMauro
*Attorney, Agent, or Firm*—Whitham, Curtis, Whitham & McGinn

[57] ABSTRACT

Disclosed is a process for purifying carbon nanotubes which has steps of 1) mixing carbon nanotubes which accompany carbon impurities with a reagent selected from a group consisting of oxidation agents, nitration agents and sulfonation agents in liquid phase, 2) reacting the carbon nanotubes with the reagent at a predetermined temperature in the liquid phase, wherein the carbon impurities except carbon nanotubes are selectively reacted to dissolve in the liquid phase, and 3) separating carbon nanotubes from which the impurities were released from the liquid phase then washing and drying it. A process for uncapping carbon nanotubes and a process for chemically modifying carbon nanotubes are also disclosed.

6 Claims, 10 Drawing Sheets

5,698,175

PROCESS FOR PURIFYING, UNCAPPING AND CHEMICALLY MODIFYING CARBON NANOTUBES

FIELD OF THE INVENTION

This invention relates to a process for purifying, uncapping and chemically modifying carbon nanotubes, and more particularly to a process for easily obtaining highly purified nanotubes and certainly uncapped nanotubes which are expected to be used in the field of next-generation industry which includes chemistry, drugs and electronics.

BACKGROUND OF THE INVENTION

It is known that crude carbon nanotubes after synthesis have been capped at the tips by carbon fragments which comprise pentagons (five-membered carbon rings) as well as carbon impurities such as carbon nanoparticles, amorphous carbons or the like, as shown in FIG. 1, are adhered to around them. To put them into practical use, it is indispensable for the impurities to be removed.

A conventional process for purifying and uncapping carbon nanotubes is conducted in a manner that they are oxidized under an atmosphere with an oxidative gas such as oxygen, steam or the like at a high temperature (refer to the specification of Japanese Patent Application No. 5-133048). Such method is based upon that graphite at the tips is more distorted than cylindrical graphite which constitutes a side wall of a nanotube therefor becoming more reactive to oxidation to selectively be oxidized. It is also because the resistivity against oxidation which derives from the three-dimensional structure is different between nanoparticles and nanotubes.

However, the conventional process for purifying and uncapping carbon nanotubes requires a high reaction temperature, e.g., 600 to 1000 degree C. Therefore, it is difficult to control or select an optimum time and temperature for the reaction.

SUMMARY OF THE INVENTION

Accordingly, it is an object of the invention to provide a process for easily obtaining highly purified nanotubes.

It is a further object of the invention to provide a process for easily obtaining certainly uncapped nanotubes.

It is a still further object of the invention to provide a process for introducing a functional group to nanotubes.

According to the invention, a process for purifying carbon nanotubes, comprises:

mixing carbon nanotubes which accompany carbon impurities with a reagent selected from a group consisting of oxidation agents, nitration agents and sulfonation agents in liquid phase;

reacting the carbon nanotubes with the reagent at a predetermined temperature in the liquid phase, wherein the carbon impurities except carbon nanotubes are selectively reacted to dissolve in the liquid phase; and separating carbon nanotubes from which the impurities were released from the liquid phase then washing and drying it.

Further, according to the invention, a process for uncapping carbon nanotubes, comprises:

mixing carbon nanotubes which are capped by carbon fragments at the tips thereof with a reagent selected from a group consisting of oxidation agents, nitration agents and sulfonation agents in liquid phase; and reacting the carbon nanotubes with the reagent at a predetermined temperature in the liquid phase, wherein the carbon fragment except carbon nanotubes are selectively reacted to dissolve in the liquid phase.

According to the invention, a process for chemically modifying carbon nanotubes, comprises:

mixing nanotubes which are crude or purified with a reagent having nitro-, sulfo-, carboxyl-, carbonyl-, ether- or phenolic hydroxyl-functional group or a mixed reagent of at least two of the reagent in liquid phase; and reacting the carbon nanotubes with the reagent or the mixed reagent at a predetermined temperature in the liquid phase, wherein the functional group or groups is introduced to carbon nanotubes.

The purification process of the invention utilizes the reactivity or reaction rate of the oxidation agent or the like to carbon is different between a carbon nanotube and a carbon nanoparticle or amorphous carbon since they have different three-dimensional structures. The amorphous carbon is highly reactive to a reaction reagent since it has a disordered part at the circumference where carbon-carbon bond is broken. Therefore, for instance, in oxidation, the amorphous carbon is more quickly oxidized than carbon nanotubes. This causes that amorphous carbon is early oxidized to be transformed into carbon dioxide and it first disappears.

In the comparison of carbon nanotubes and carbon nanoparticles, the difference in reactivity and reaction rate thereof should be considered of their structures. Namely, the curvature surface of the tips of carbon nanotubes has longer radius of curvature than that of the side walls of carbon nanoparticles. Because of this, the tips of carbon nanotubes are more reactive than the side wall of carbon nanoparticles. Similarly, from the structural comparison of the side walls of the carbon nanotubes and the side walls of carbon nanoparticles, the side walls of carbon nanotubes is less reactive than that of carbon nanoparticles: Accordingly, at the initial stage of a reaction, the tips of carbon nanotubes first start reacting, then carbon nanoparticles reacts prior to the side walls of carbon nanotubes which show the highest resistivity against the reaction. As a result, for instance, in oxidation reaction, only carbon nanotubes are finally left while carbon nanoparticles disappear.

As described above, for instance of an oxidation reaction, when a sufficient time for the reaction is given, amorphous carbon and carbon nanoparticles can be extinguished while leaving only carbon nanotubes. This results in the purification of carbon nanotubes.

Although the theory of the purification process of the invention is similar to that of the invention of Japanese Patent Application No. 5-133048 as mentioned above, according to the present invention, purified nanotubes which have a certain quality can be easily obtained at high yield by milder condition since the reaction is proceeded in liquid phase.

Next, the invention can also provide a process for obtaining uncapped carbon nanotubes. The uncapped carbon nanotubes which have a diameter in the order a nanometer and a length of in the order of a micrometer can be used as a one-dimensional microcapsule or a micro test tube within which various chemical reactions and physical phenomena can be occurred. They are expected to establish a performance which is not obtained in known materials. In particular, they are expected to be used as an electronic device characterized in the microstructure and unique electrical properties. In order to achieve the properties, it is required that high-quality carbon nanotubes which do not contain carbon nanoparticles and amorphous carbon can be easily purified at high yield. Such uncapped nanotubes can be made by a process in which capped nanotubes are reacted in an aqueous solution including a reaction reagent, for example, sulfuric acid, nitric acid, the mixture of sulfuric acid and nitric acid, chloro-sulfuric acid or potassium permanganate to be uncapped. In such a process, various chemical reactions can selectively be effected to uncap of carbon nanotubes.

The theory of the uncapping process appears to be based upon the difference of the chemical reactivity at a molecular level between pentagons and hexagons(six-membered carbon rings) which are included in graphite comprising the outer wall of carbon nanotubes. It is generally known that pentagons are more reactive than hexagons. Carbon nanotubes have outer walls closed by a graphite layer, containing only hexagons in the side walls of the outer walls and containing in total twelve pentagons other than hexagons in both edge portions of the outer walls, i.e. tips of the carbon nanotubes. Therefore, the pentagons contained in the tips of the carbon nanotubes is likely to selectively accept the attack by the reaction reagent such as sulfuric acid, nitric acid or the like. Because of this, the pentagons first start splitting. Along with the splitting of the pentagons, the hexagons adjacent to the pentagons gradually start splitting while extending the split portion. Furthermore, the splitting reaction proceeds, to a graphite lower layer which constitutes a carbon nanotube. As a result, carbon nanotubes can be uncapped at the tips.

Third, the invention can also provide a process for obtaining carbon nanotubes to which various functional groups such as nitro-, sulfon-, carboxyl- carbonyl-, ether- or phenolic hydroxyl-group and the like are introduced. Depending on a reaction condition, the functional groups are introduced to not only around the uncapped portion of a carbon nanotube but also the entire surface of the carbon nanotube. When carbon nanotubes are reacted with the reaction reagent, the carbon terminals reacted are introduced of functional groups derived from the reaction reagent, or they are not terminated and are left as radicals occurring when carbon-carbon bonds split. These functional groups may be eliminated at a high temperature of 500 to 700 degree C. However, they may be utilized to add a function to the carbon nanotubes by molecule-modifying. For example, the carbon nanotubes which are modified with sulfonic groups are expected to have an ion-exchange function. The carbon nanotubes which are modified with carboxyl or phenolic hydroxyl group are expected to show a catalyst function as solid acid. Furthermore, the carbon nanotubes which carry a metal as an ion-exchanger may function as a complex compound catalyst. When the terminals of the graphite sheet contain radicals, the radicals may be terminated to with a treatment at a high temperature if they are not necessary. Meanwhile, the treated radicals of the carbon terminals in the carbon nanotubes may have specific physical and chemical properties and show a novel catalyst function.

DESCRIPTION OF THE DRAWINGS

The invention will be explained in more detail in conjunction with the appended drawings, wherein.

DESCRIPTION OF THE PREFERRED EMBODIMENTS

Figure 1:
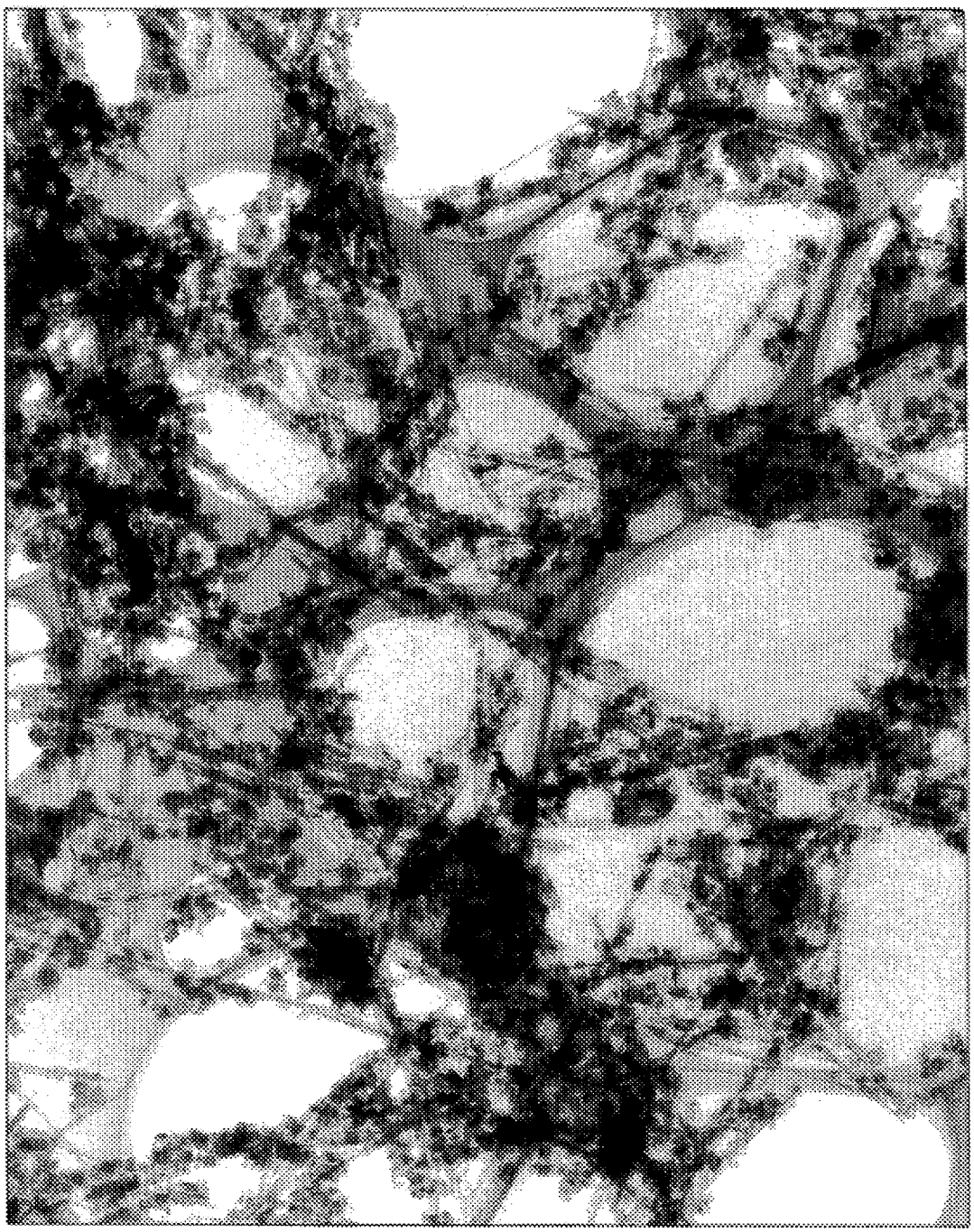
FIG. 1 is the TEM image showing crude nanotubes before treatment.

The preferred embodiments of the invention will be described below. Crude carbon nanotubes are synthesized by the method reported in T. W. Ebbesen & P. M. Ajayan, "Large-scale synthesis of carbon nanotubes", Nature, vol. 358, pp. 220–222 (1992). FIG. 1 shows the TEM (Transmission Electron Microscopy) image of the crude nanotubes before the treatment. It can be appreciated that the carbon nanotubes and carbon nanoparticles are mutually mixed and the carbon nanotubes before the treatment are capped at the tips thereof.

The crude carbon nanotubes are formed into a powder by grinding it to apply the purification and uncapping process of the invention. The carbon nanotubes treated by using the process is observed by using TEM to determine the percentage of uncapping and the degree of purifying of the carbon nanotubes. To provide a sample for observation by TEM, carbon nanotubes are dispersed with ultrasonic into a organic solvent such as methanol, and the suspension is then dropped with a syringe into a microgrid made of copper, thereafter drying it at room temperature. Moreover, the chemical state of the carbons which compose carbon nanotubes treated by the process of the invention, i.e., the functional group introduced into the carbon nanotubes, is identified by using XPS (X-ray photoelectron spectroscopy, also named ESCA)

EXAMPLE 1

Two hundreds mg of crude carbon nanotubes are dispersed with ultrasonic into the mixture solution of 40 ml of 96% sulfuric acid and 40 ml of 70% nitric acid. Then it is boiled and refluxed for 2 to 6 hours at the temperature of 120° to 180° C. (degree C) (temperature in water bath) with agitating in air. After the reaction, filtering by a glass filter (pore size: G4), the reacted carbon nanotubes precipitated on the glass filter are washed by purified water. If necessary, it is neutralized with aqueous solution of sodium hydrogencarbonate, further washing by purified water. The reactant is dried at room temperature(overnight), or it is dried in vacuum at the temperature of 60 degree C. The yield (weight %) is about 40%.

Figure 2:
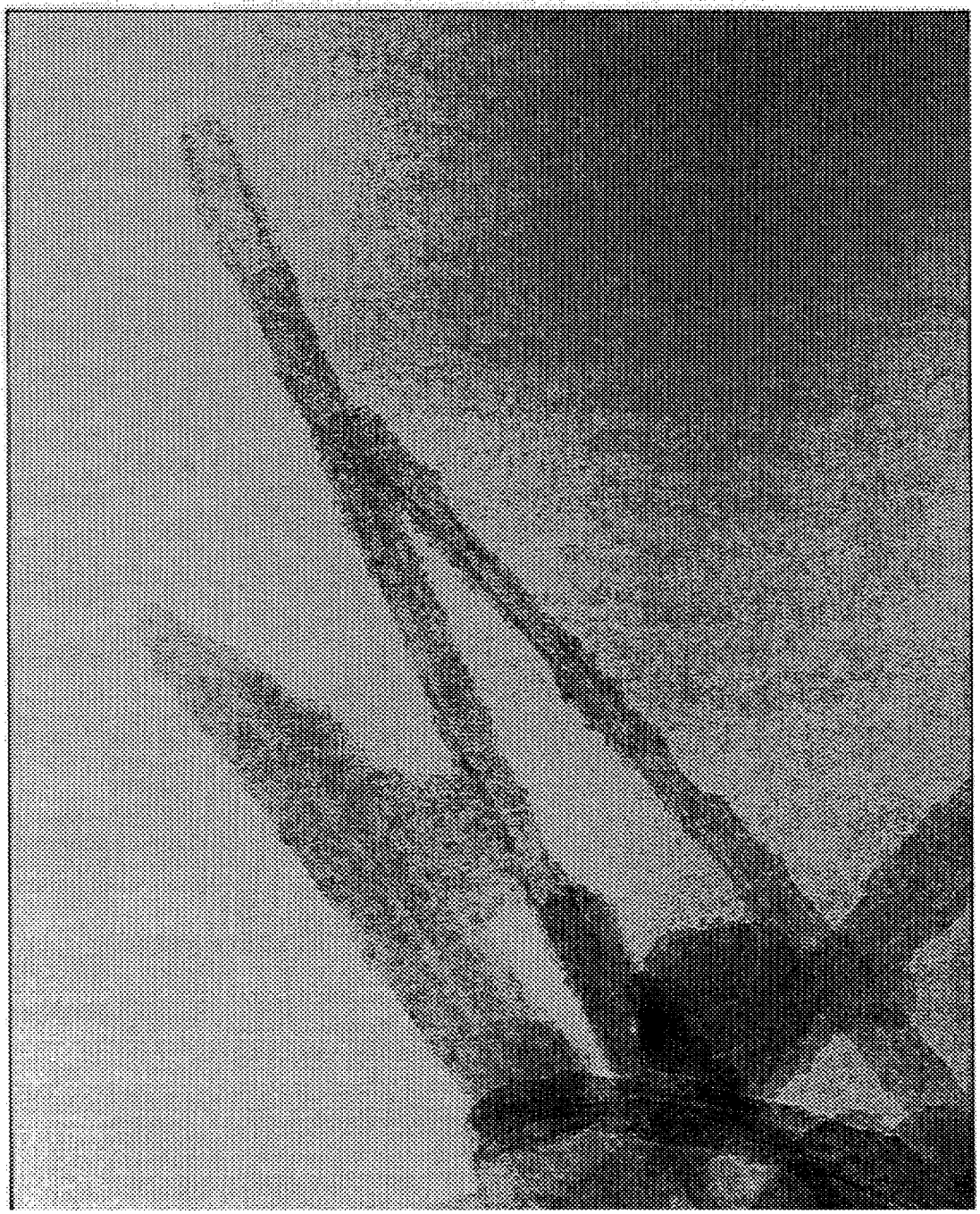
FIG. 2 is the TEM image showing nanotubes treated with the mixture solution of sulfuric acid and nitric acid.
Figure 3:
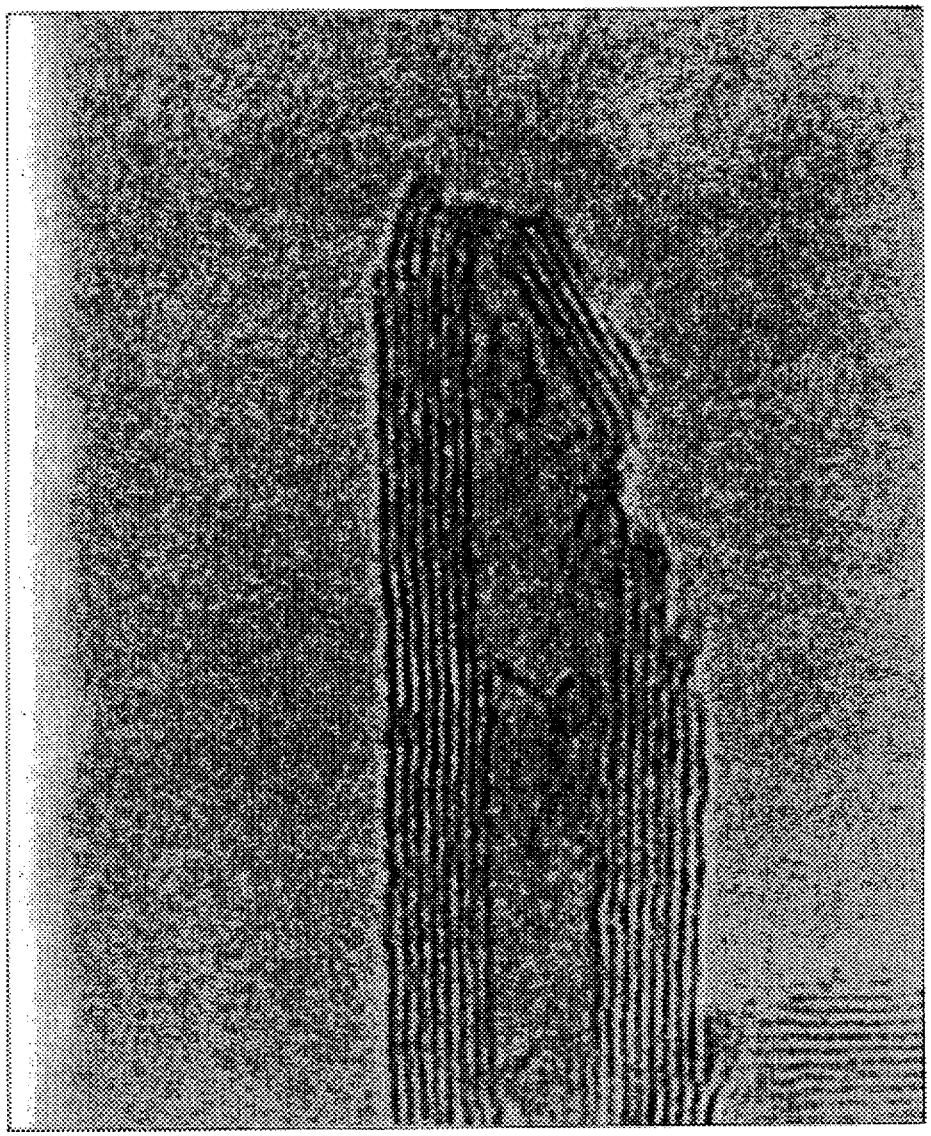
FIG. 3 is the magnified TEM image showing that nanotubes treated with the mixture solution of sulfuric acid and nitric acid are uncapped at around pentagons.

FIG. 2 shows the TEM image of the carbon nanotubes treated with the mixture solution of sulfuric acid and nitric acid. It is generally known that pentagons exist at the tips of the carbon nanotubes where radius of curvature changes. From detail analysis, it is found that the uncapping of carbon nanotubes starts from the point where the pentagons selectively reacts. This example is shown in the magnified TEM image in FIG. 3. This means that the process of the invention has higher selectivity than the conventional process. Moreover, it is found that the erosion of a nanotube, i.e., the problem of the conventional process by which the nanotube shortens rapidly during oxidation proceeds is not observed. Therefore, according to the process of the invention, it is possible to react only with the tips of carbon nanotubes and uncap it from there.

Figure 4:
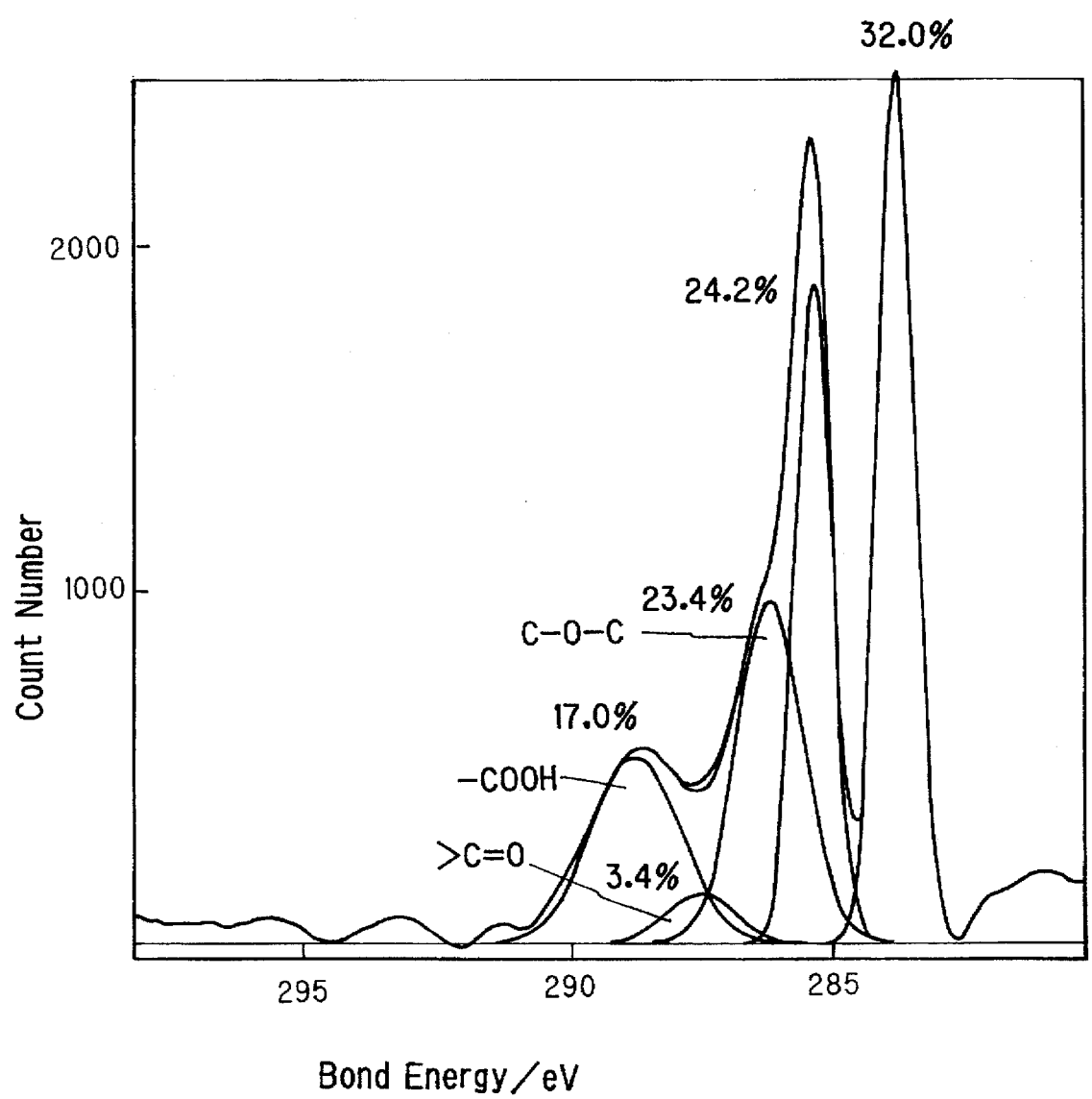
FIG. 4 is the differential spectrum which is obtained by subtracting the XPS spectrum of the untreated nanotubes from the XPS spectrum of the treated nanotubes.

Furthermore, XPS is determined to identify the functional group introduced. At first, the XPS peaks of C1s of the treated and untreated are determined and compared. As a result, in the treated nanotubes, the C1s subpeak which is identified to derive from the functional group such as ether-, carbonyl-, carboxyl group or the like other than the C1s main peak as usual graphite is observed. FIG. 4 shows the differential spectrum which is obtained by subtracting the XPS spectrum of the untreated nanotubes from the XPS spectrum of the treated nanotubes and the peaks divided from the differential spectrum are also shown there. Respective peaks divided responds to the functional groups as mentioned above. From this spectrum analysis, the chemical state of carbon in the carbon nanotubes, i.e., the percentages of the functional groups are identified as shown in Table 1 below. The data of the untreated nanotubes is also shown as a reference.

TABLE 1

|  | —COOH | >C=O | C—O—C | graphite,******** |
|---|---|---|---|---|
| untreated | 0% | 0% | 0% | 100% |
| treated | 3% | 1% | 4% | 92% |

From this table 1, it is understood that the functional groups having considerable percentages are introduced into the treated nanotubes. In addition, when the XPS analysis is conducted regarding nitrogen atom, it is found that a N1s peak which is not observed in the untreated nanotubes exists. The N1s peak shows the introduction of the functional group containing nitrogen which is presumed nitro group.

EXAMPLE 2

Figure 5:
FIG. 5 is, the TEM image showing nanotubes treated with sulfuric acid.

Two hundreds mg of crude nanotubes are dispersed with ultrasonic into 75 ml of 96% sulfuric acid. The experimental procedures hereafter are the same as described in Example 1. The yield is about 80%. FIG. 5 shows the TEM image of the nanotubes treated with sulfuric acid. Because little nanotubes are uncapped in FIG. 5, it is understood that sulfuric acid by itself does not show an uncapping ability to nanotubes. However, the pentagons at the tips of the nanotubes are sulfonated.

EXAMPLE 3

Figure 6:
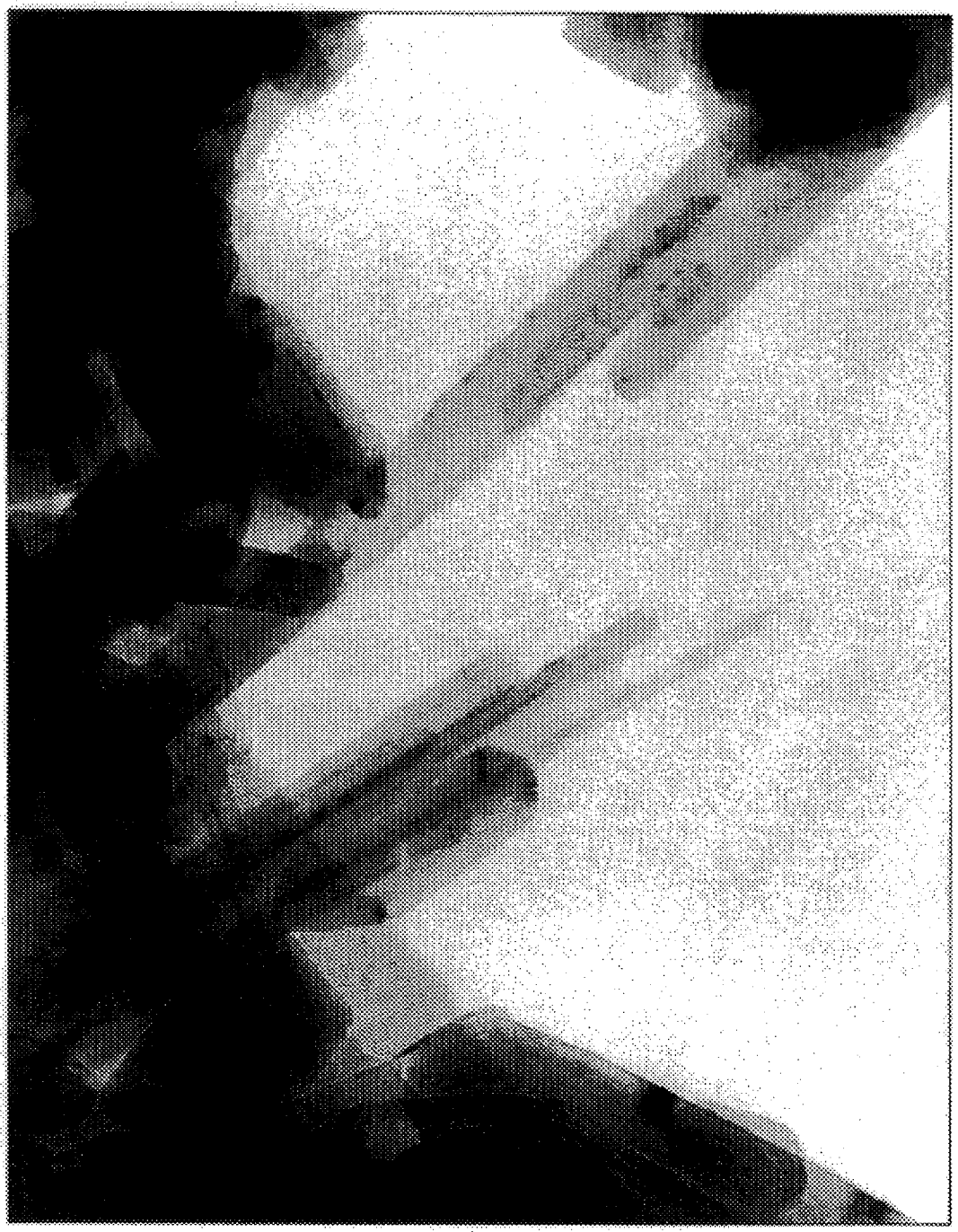
FIG. 6 is the TEM image showing nanotubes treated with nitric acid.

Two hundreds mg of crude nanotubes are dispersed with ultrasonic into 75 ml of 70% nitric acid solution. The experimental procedures hereafter are the same as described in Example 1. The yield is about 80%. FIG. 6 shows the TEM image of the nanotubes treated with nitric acid. In FIG. 6, it is found that the uncapped nanotubes exist. From XPS analysis, the existence of nitrogen which shows the introduction of nitro group into nanotubes is found.

EXAMPLE 4

Figure 7:
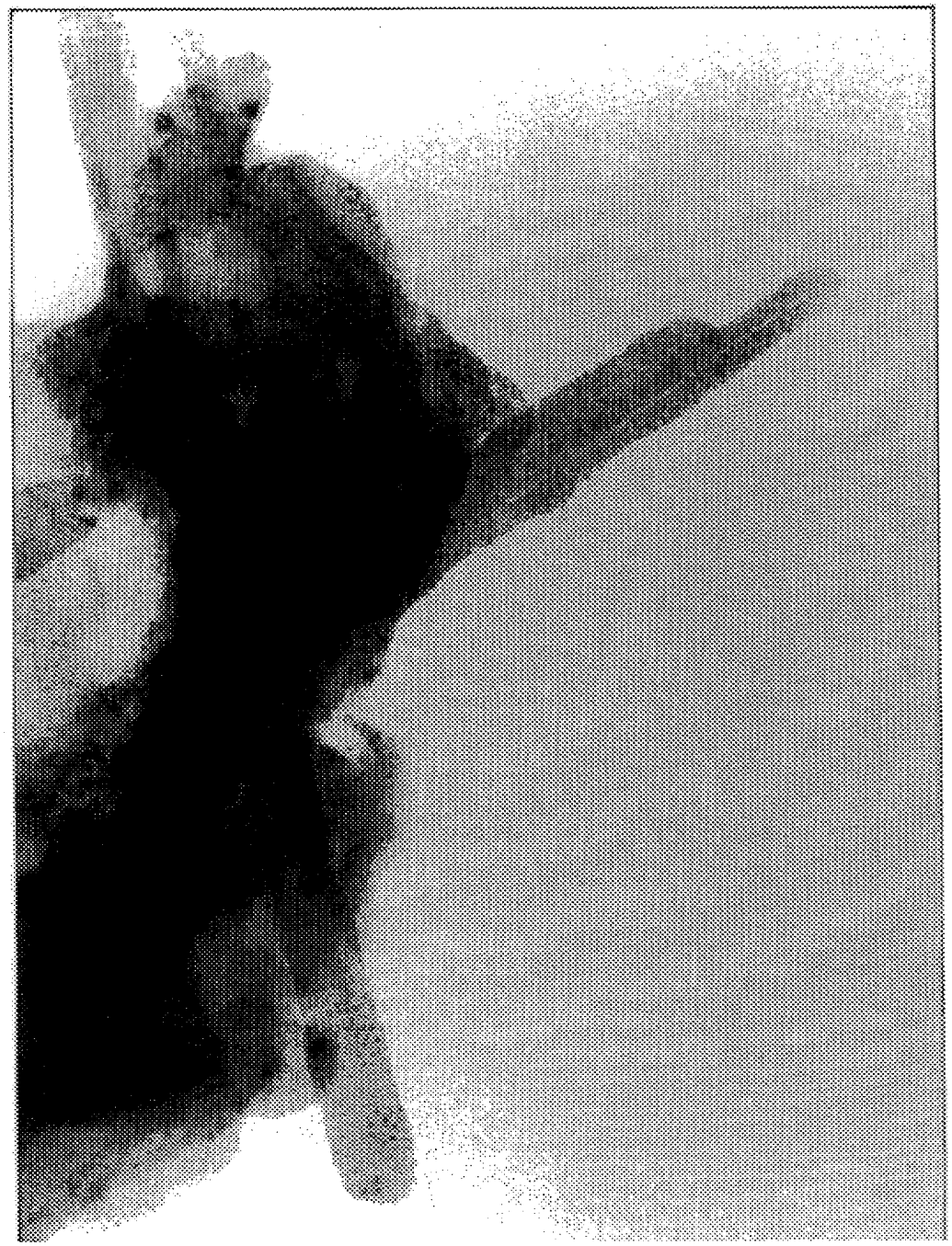
FIG. 7 is the TEM image showing nanotubes treated with chlorosulfonic acid.

Two hundreds mg of crude nanotubes of 200 mg are dispersed with ultrasonic into 75 ml of chlorosulfonic acid (ClSO3H) solution. The experimental procedures hereafter are the same as described in Example 1. The yield is about 60%. FIG. 7 shows the TEM image of the nanotubes treated with chlorosulfonic acid. In FIG. 7, it is found that the surfaces of the nanotubes have dots. This appears to be caused by that the surfaces of the nanotubes react with chlorosulfonic acid thereby introducing functional groups. Therefore, it is understood that the characteristics of the surface of a nanotube can be improved by the reaction in liquid phase.

EXAMPLE 5

Two hundreds mg of crude nanotubes are dispersed with ultrasonic into 40 ml of 10% diluted sulfuric acid solution. On the other, prepared is the solution which potassium permanganate is dissolved into 10% diluted sulfuric acid solution of 40 ml (50 ml when the mole ratio of nanotubes and carbon is 0.2 (20%)). The sulfuric-acidic potassium permanganate solution is added in droplet to the diluted sulfuric acid solution containing the nanotubes while the latter solution is boiled and refluxed with agitating at the temperature of 120 to 150 degree C(water bath temp.) After refluxing for 5 hours, the reactant is filtered with a glass filter, then being washed by purified water. If the particles of manganese dioxide which occurs in the reaction is seen in the reactant being filtered, manganese dioxide is dissolved with concentrated hydrochloric acid to be removed. If necessary, it is neutralized by adding aqueous solution of sodium hydrogencarbonate, further washing by purified water. The reactant is dried at room temperature(overnight), or it is dried in vacuum at the temperature of 60 degree C. for 2 hours. The yield is about 55% (the mole ratio of potassium permanganate is 20%).

Figure 8:
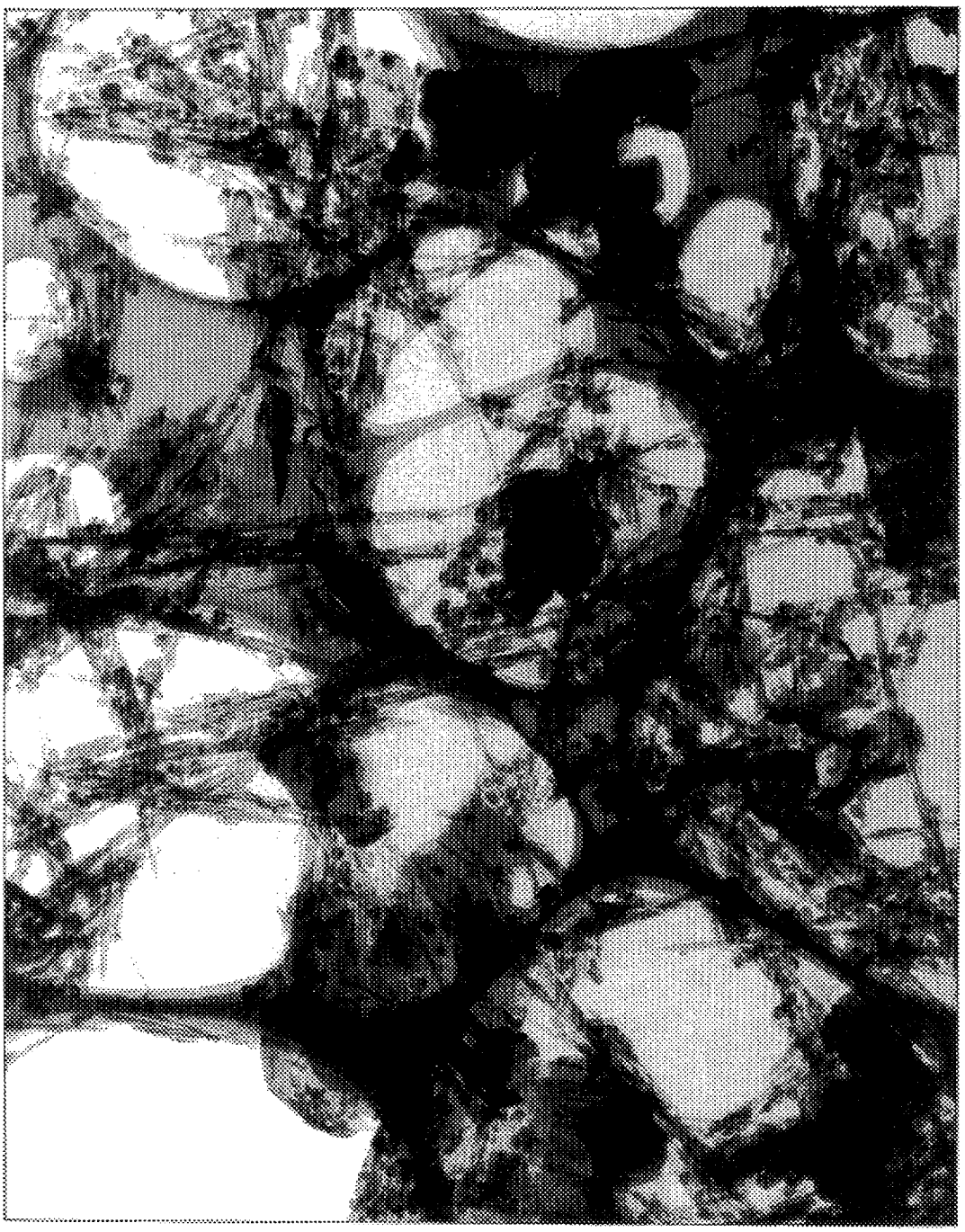
FIG. 8 is the TEM image showing nanotubes treated with potassium permanganate dilute sulfuric acid solution.
Figure 9:
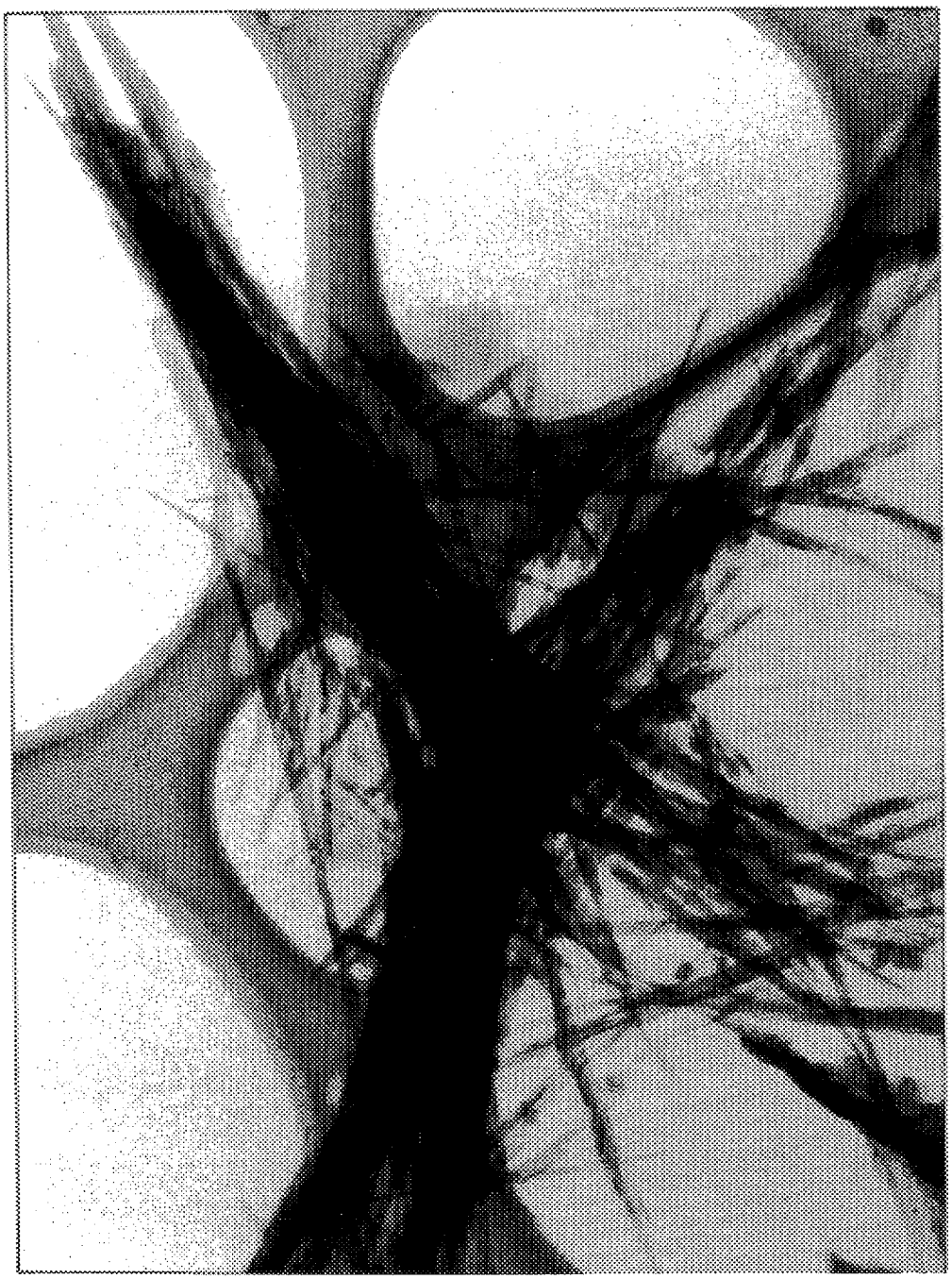
FIG. 9 is the TEM image showing nanotubes purified with potassium permanganate dilute sulfuric acid solution.
Figure 10:
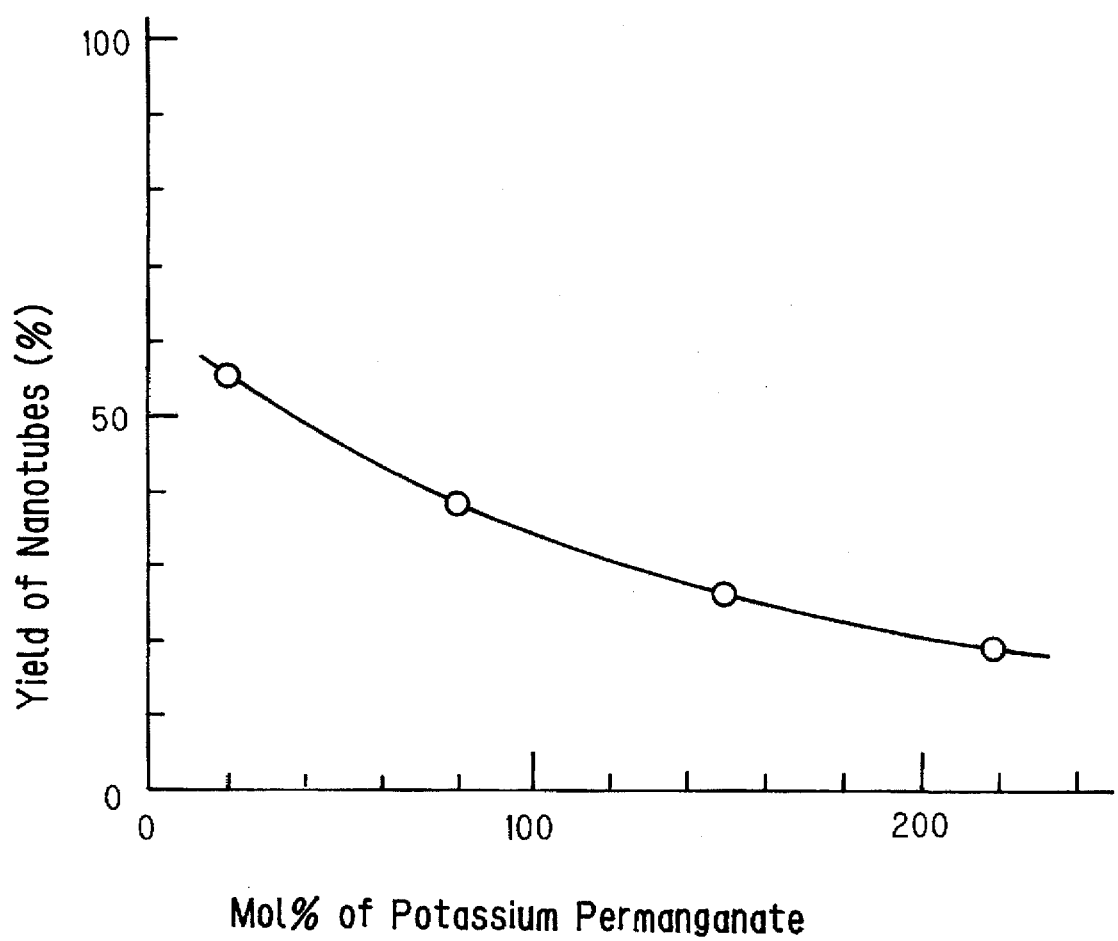
FIG. 10 is the graph showing the relation between the mole ratio (%) of potassium permanganate to nanotubes and the yield (%) of purified nanotubes.

FIG. 8 shows the TEM image of the nanotubes treated with potassium permanganate dilute sulfuric acid solution (the mole ratio of potassium permanganate is 20%). In FIG. 8, it is observed that the tips of the nanotubes are uncapped and are pointed as a bill. From XPS analysis, it is proved that a functional group such as carboxyl-, carbonyl-, ether-, phenolic hydroxyl-group or the like exists at the opening ends of the nanotubes. Therefore, when nanotubes are treated with potassium permanganate dilute sulfuric acid solution, the reaction occurring to the nanotubes is mainly an oxidation reaction. On the other hand, it is observed that carbon nanoparticles are rounded off and becomes smaller globes in oxidation reaction. When the reaction time is longer or the mole ratio of oxidizing agent added to nanotubes is higher, it is observed that the mean diameters of the carbon nanoparticles become smaller. Finally, it is seen that the carbon nanoparticles are eliminated and only the nanotubes are left to be purified. FIG. 9 shows the TEM image of the carbon nanotubes(the mole ratio of potassium-permanganate thereto is 80%) purified by this process. FIG. 10 shows the relation between the mole ratio (%) of potassium permanganate to nanotubes and the yield (%) of purified nanotubes. In FIG. 10, it is understood that nanoparticles are mostly eliminated by adding potassium permanganate of the mole ratio of more than 80 to 100% thereby nanotubes being purified.

According to the invention, the purifying technique of nanotubes can significantly be enhanced, thereby the yield of purified nanotubes is more than about 50% whereas the yield of that in the conventional purification process is about 1%. Moreover, since the process of the invention employs a milder condition of reaction, the degree of reaction can be easily controlled. Therefore, if the time of reaction is controlled, then nanotubes which have various states of proceeding of reaction may be obtained. Furthermore, various functional groups such as nitro-, sulfonic-, carboxyl-, carbonyl-, ether-, phenolic hydroxyl-group and the like can also be introduced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A process for purifying carbon nanotubes, comprising:

combining a mixture of carbon nanotubes and accompanying carbon impurities, with a reagent selected from the group consisting of liquid phase oxidation agents, liquid phase nitration agents, and liquid phase sulfonation agents;

reacting said mixture with said reagent at a temperature effective to selectively dissolve said carbon impurities in the liquid phase, thereby releasing carbon nanotubes from said impurities; and separating said released carbon nanotubes from said liquid phase and subsequently washing and drying said carbon nanotubes.

2. A process for purifying carbon nanotubes, according to claim 1, wherein said temperature is about 120 to about 180 degrees Celsius.

3. A process for uncapping carbon nanotubes, comprising:

mixing carbon nanotubes which are capped by carbon fragments at the tips thereof with a reagent selected from the group consisting of liquid phase oxidation agents, liquid phase nitration agents, and liquid phase sulfonation agents; and reacting said carbon nanotubes with said reagent in the liquid phase at a temperature effective to selectively dissolve said carbon fragments, thereby uncapping said carbon nanotubes.

4. A process for uncapping carbon nanotubes, according to claim 3, wherein said temperature is about 120 to about 180 degrees Celsius.

5. A process for chemically modifying carbon nanotubes, comprising:

mixing carbon nanotubes which are crude or purified with a liquid phase reagent having nitro-, sulfo-, carboxyl-, carbonyl-, ether, or phenolic hydroxyl-functional group or a mixed reagent of at least two of said reagents in liquid phase; and reacting said carbon nanotubes with said reagent or said mixed reagents at a temperature effective to introduce said functional group or groups into said nanotubes in the liquid phase.

6. A process for chemically modifying carbon nanotubes, according to claim 5, wherein said temperature is about 120 to about 150 degrees Celsius.

* * * * *